(12) United States Patent
Rajagopal (10) Patent No.: US 12,521,237 B2
(45) Date of Patent: Jan. 13, 2026

(54) TRANSCATHETER VALVE IMPLANT ASSEMBLY WITH VENTRICULAR ASSIST DEVICE RELEASABLY CONNECTABLE TO DOCKING STATION

(71) Applicant: Keshava Rajagopal, Bellaire, TX (US)

(72) Inventor: Keshava Rajagopal, Bellaire, TX (US)

( * ) Notice: Subject to any disclaimer, the term of this patent is extended or adjusted under 35 U.S.C. 154(b) by 733 days.

(21) Appl. No.: 17/968,935

(22) Filed: Oct. 19, 2022

(65) Prior Publication Data

US 2023/0130224 A1    Apr. 27, 2023

Related U.S. Application Data

(60) Provisional application No. 63/270,322, filed on Oct. 21, 2021.

(51) Int. Cl.
| | | |
|---|---|---|
| *A61F 2/24* | (2006.01) | |
| *A61M 60/139* | (2021.01) | |
| *A61M 60/148* | (2021.01) | |
| *A61M 60/165* | (2021.01) | |
| *A61M 60/216* | (2021.01) | |
| *A61M 60/237* | (2021.01) | |
| *A61M 60/416* | (2021.01) | |
| *A61M 60/861* | (2021.01) | |

(52) U.S. Cl.
CPC .......... *A61F 2/2418* (2013.01); *A61F 2/2427* (2013.01); *A61M 60/139* (2021.01); *A61M 60/148* (2021.01); *A61M 60/165* (2021.01); *A61M 60/216* (2021.01); *A61M 60/237* (2021.01); *A61M 60/416* (2021.01); *A61M 60/861* (2021.01); *A61F 2220/0016* (2013.01)

(58) Field of Classification Search
CPC .............. A61M 60/139; A61M 60/148; A61M 60/165; A61M 60/216; A61M 60/237; A61M 60/416; A61M 60/861; A61F 2/2418; A61F 2250/006
See application file for complete search history.

(56) References Cited

U.S. PATENT DOCUMENTS

| | | |
|---|---|---|
| 10,034,747 B2 | 7/2018 | Harewood |
| 10,363,130 B2 | 7/2019 | Armer et al. |
| | (Continued) | |

FOREIGN PATENT DOCUMENTS

WO    2019006387 A1    1/2019

*Primary Examiner* — Suba Ganesan
(74) *Attorney, Agent, or Firm* — Thompson Coburn LLP (57) ABSTRACT

A transcatheter valve implant assembly has a ventricular assist device, a prosthetic valve, a stent frame structure, and a docking station, and is implanted at an aortic or a pulmonary valve. During implantation, the native valve leaflets of the respective valve at the implantation site are engaged with the prosthetic valve and/or the stent frame structure while the stent frame structure is connected to the docking station with the prosthetic valve adjacent to the proximal end of the stent frame structure. The ventricular assist device is inserted into the interior the stent frame structure with an inlet of ventricular assist device positioned in the respective ventricle associated with the implantation site and the outlet of the ventricular assist device positioned to discharge into the respective blood vessel associated with the implantation site. The ventricular assist device is releasably connected with the stent frame structure and the docking station.

33 Claims, 8 Drawing Sheets

(56) References Cited

U.S. PATENT DOCUMENTS

| | | | |
|---|---|---|---|
| 11,191,638 B2 | 12/2021 | Armer et al. | |
| 2004/0030381 A1* | 2/2004 | Shu | A61F 2/2409 623/2.11 |
| 2010/0249489 A1* | 9/2010 | Jarvik | A61M 60/148 600/16 |
| 2012/0029265 A1 | 2/2012 | LaRose et al. | |
| 2014/0005778 A1* | 1/2014 | Buchbinder | A61F 2/2445 623/2.37 |
| 2014/0128967 A1 | 5/2014 | Jarvik | |
| 2019/0321528 A1 | 10/2019 | Coffman | |
| 2021/0220130 A1 | 7/2021 | Rajagopal et al. | |

* cited by examiner

TRANSCATHETER VALVE IMPLANT ASSEMBLY WITH VENTRICULAR ASSIST DEVICE RELEASABLY CONNECTABLE TO DOCKING STATION

RELATED APPLICATION DATA

This application claims priority benefit to U.S. provisional patent application Ser. No. 63/270,322, filed on Oct. 21, 2021, the disclosure of which is incorporated by reference herein.

SUMMARY

The disclosure that follows is directed to a transcatheter aortic or pulmonary valve implant assembly which includes a ventricular assist device that is releasably connectable with a docking station, which can be implanted adjacent the aortic valve or pulmonary valve. The ventricular assist device is powered with a power supply implanted subcutaneously. The transcatheter valve assembly further includes a stent frame structure and a prosthetic valve that is connected with the docking station.

DETAILED DESCRIPTION

Figure 1:
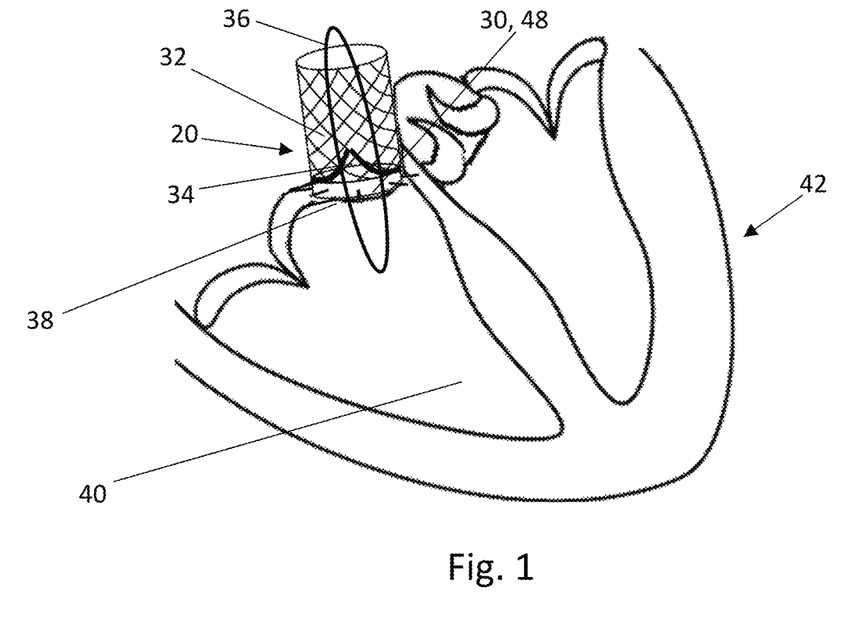
FIG. 1 is an illustration showing an exemplary ventricular assist device and valve implant assembly implanted adjacent a pulmonary valve.
Figure 2:
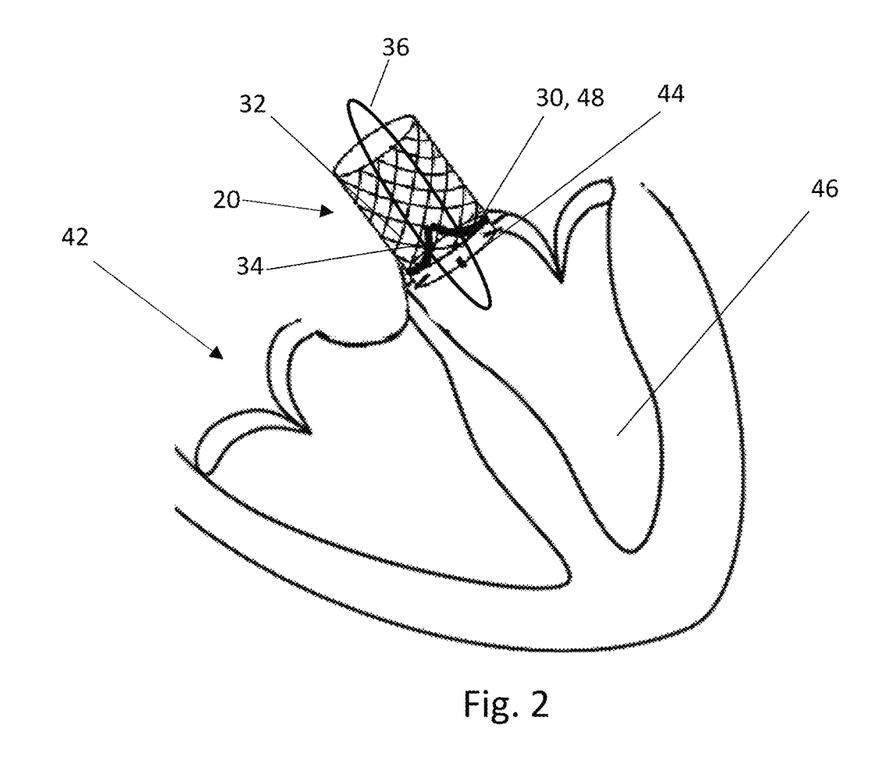
FIG. 2 is an illustration showing an exemplary ventricular assist device and valve implant assembly implanted adjacent an aortic valve.
Figure 3:
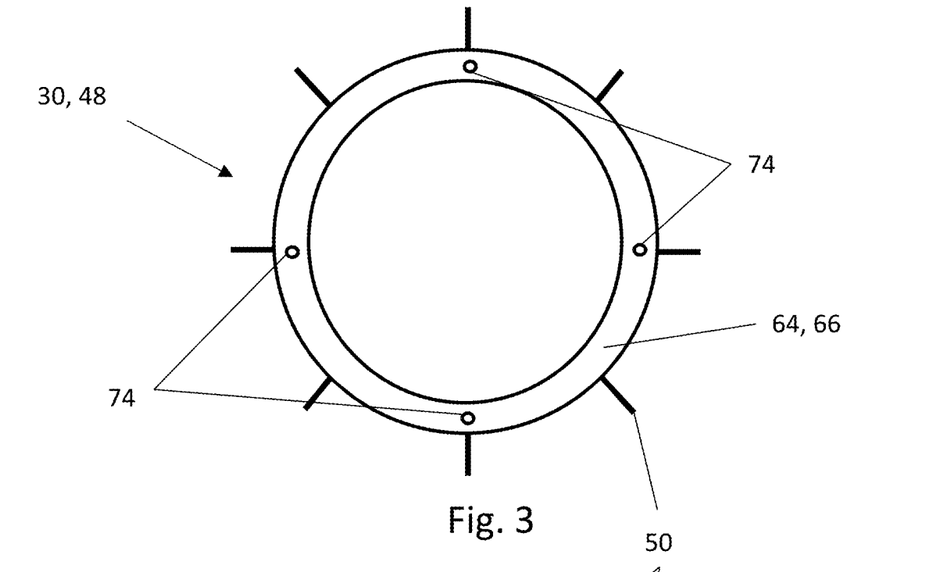
FIG. 3 is a top plan view of one embodiment of a docking station of the ventricular assist device and valve implant assembly.
Figure 4:
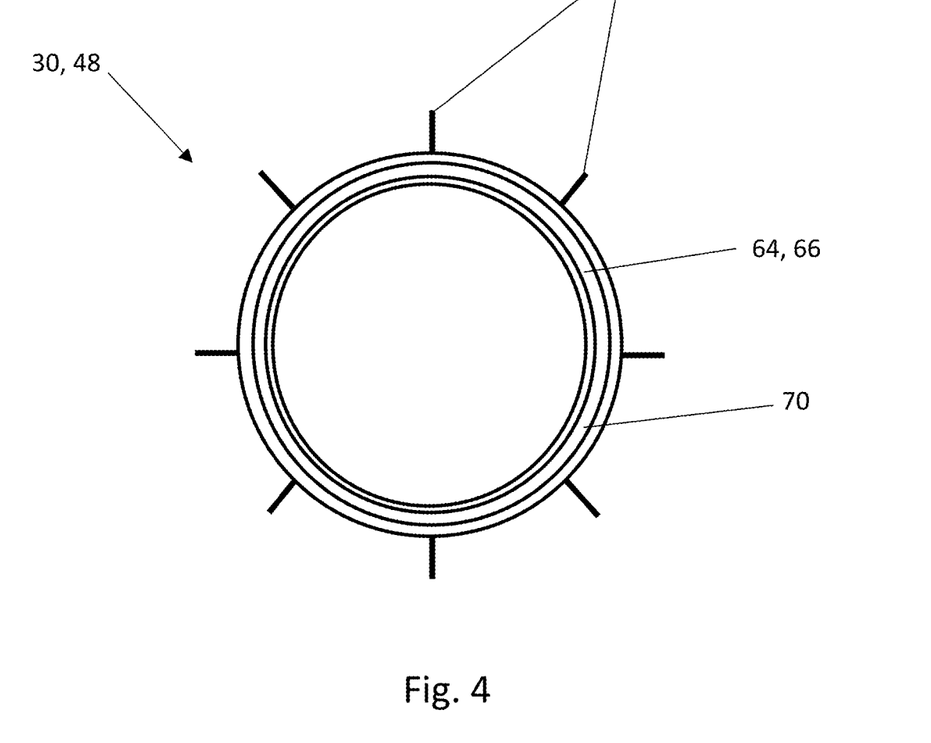
FIG. 4 is a top plan view of another embodiment of a docking station of the ventricular assist device and valve implant assembly.
Figure 5:
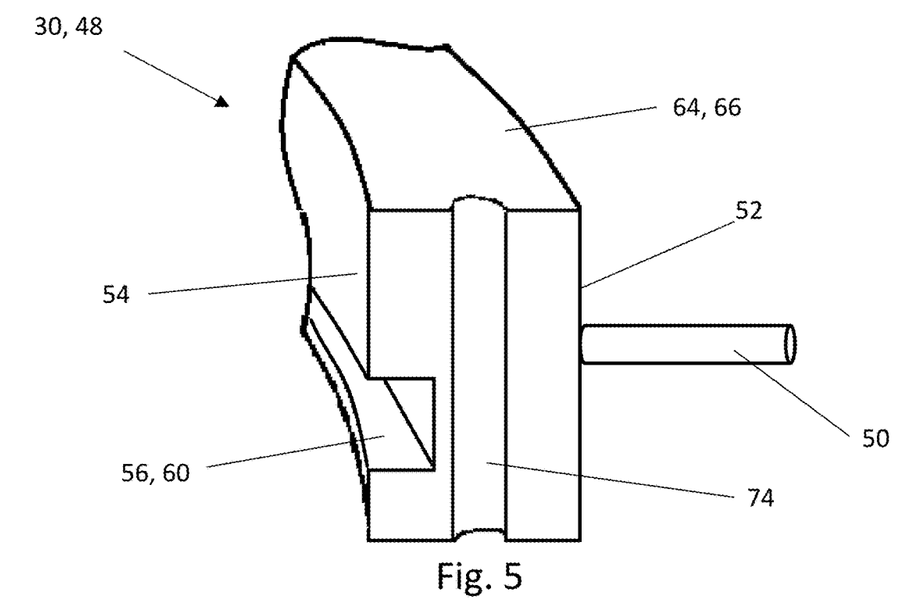
FIG. 5 is a partial side cross-section view of the docking station of FIG. 3.
Figure 6:
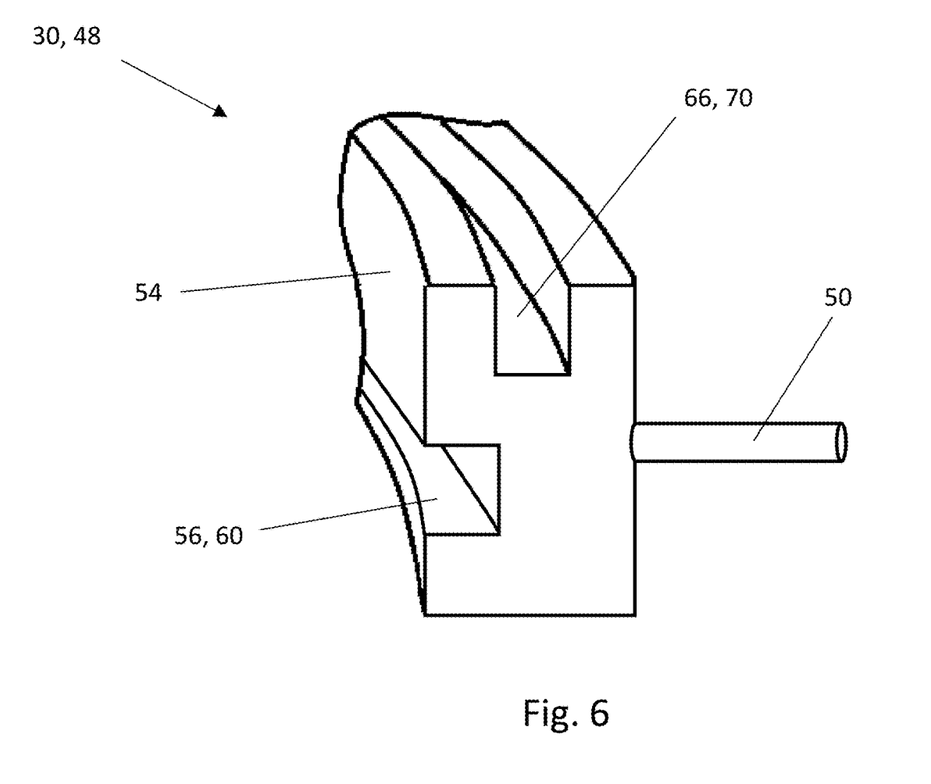
FIG. 6 is a partial side cross-section view of the docking station of FIG. 4.

FIG. 1 shows an exemplary embodiment of a transcatheter implant assembly (20) with a docking station (30) for a stent frame structure (32), a prosthetic valve (34) and a ventricular assist device (36) implanted across the pulmonary valve (38) and into the right ventricle (40) of the heart (42). FIG. 2 shows an exemplary embodiment of transcatheter implant assembly (20) with the docking station (30) for the stent frame structure (32), the prosthetic valve (34) and the ventricular assist device (36) implanted across the aortic valve (44) and into the left ventricle (46) of the heart (42).

Referring to FIGS. 3-6, the docking station (30) may comprise a subannular ring (48) that may be deployed via an open surgical technique or endoventricularly via a catheter. The subannular ring (48) may be folded or crimped to allow it to be deployed, and unfurled with a balloon catheter to secure the subannular ring in place in the desired position within the left or right ventricle (46, 40). The subannular ring (48) may be disposed at an implantation site in either the left ventricle (46) in a position upstream of/proximal to the aortic valve (44) or in the right ventricle (40) in a position upstream of/proximal to the pulmonary valve (38). The subannular ring (48) may have prongs (50) that extend radially from its outer peripheral or diameter surface (52) when the subannular ring is unfurled in the desired position. The prongs (50) may be equiangularly spaced about the outer peripheral or diameter surface or (52) of the subannular ring (48). The prongs (50) are adapted and configured to anchor the subannular ring (48) into heart tissue. Specifically, with respect to the deployment of the subannular ring (48) in the left ventricle (46) in the position inferior to the aortic valve (44), the prongs (50) of the ring may be anchored between the septum and the aortic mitral continuity so as to avoid the mitral valve anterior leaflet. When the ring (48) is deployed in and the right ventricle (40) in the position inferior to the pulmonary valve (38), the prongs (50) of the ring may be anchored in the septum and the right ventricle wall in a position that is sufficiently away from the tricuspid valve leaflets.

The subannular ring (48) may have an inner peripheral or inner diameter surface (54) with a mounting interlock or locator surface (56) adapted and configured to receive a cooperating surface or mounting interlock (58) of the ventricular assist device (36) in a manner to allow the ventricular assist device to be releasably connected to the subannular ring. For instance, the mounting interlock or locator surface (56) on the inner peripheral surface (54) of the subannular ring (48) may have one or more grooves (60), which may be continuous, discontinuous, tapered and/or helical, and that cooperate with a ridge or tabs (62), which may be continuous, discontinuous, tapered and/or helical, on the outer surface of the ventricular assist device (36), thereby allowing the ventricular assist device to be releasably connected anchored to the inner peripheral or diameter surface of the subannular ring. The ridge or tabs (62) on the outer surface of the ventricular assist device (36) may have a complementary geometry with the groove(s) (60) on the inner peripheral or inner diameter surface of the subannular ring (48) to allow the ventricular assist device to be releasably connected to the subannular ring.

Figure 7:
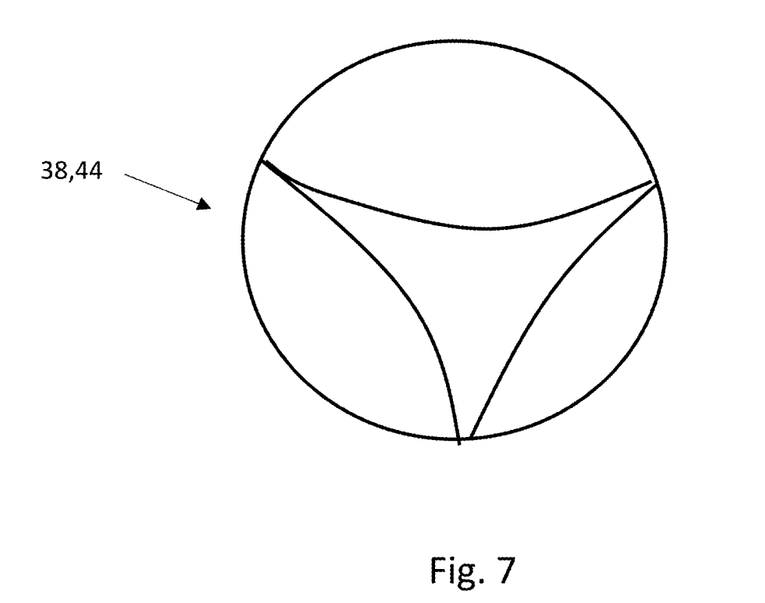
FIG. 7 is an illustration of the aortic/pulmonary valve prior to implantation of the ventricular assist device and valve implant assembly.
Figure 8:
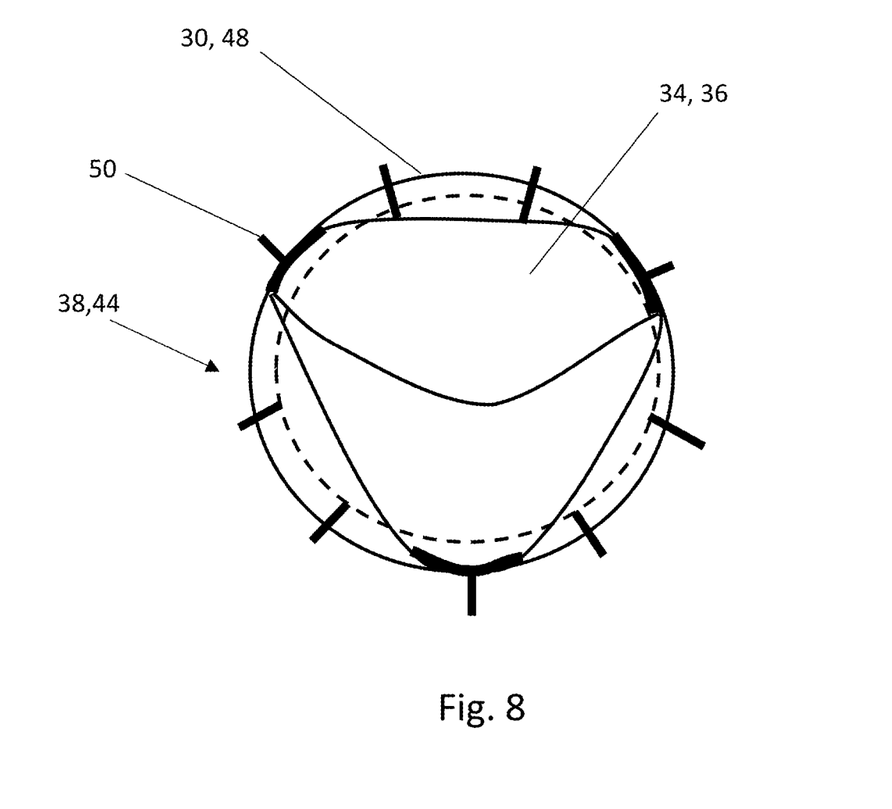
FIG. 8 is an illustration of the aortic/pulmonary valve after to implantation of the ventricular assist device and valve implant assembly.
Figure 9:
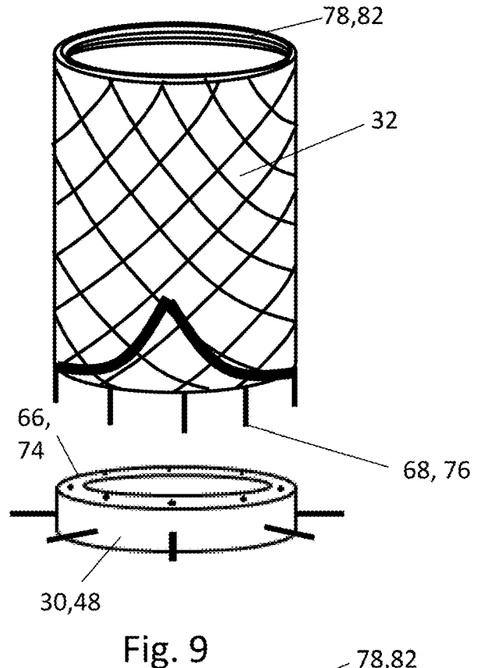
FIG. 9 is an illustration of one embodiment of a prosthetic valve implant and stent frame assembly with the docking station of FIG. 3.
Figure 10:
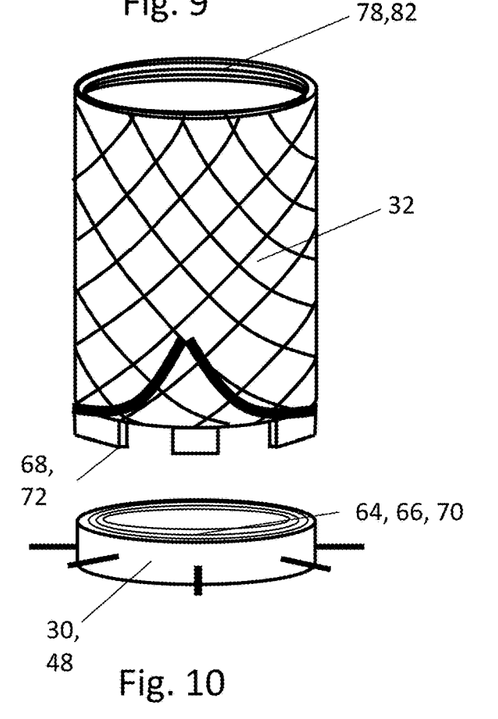
FIG. 10 is an illustration of another embodiment of a prosthetic valve implant and stent frame assembly with the docking station of FIG. 4.
Figure 11:
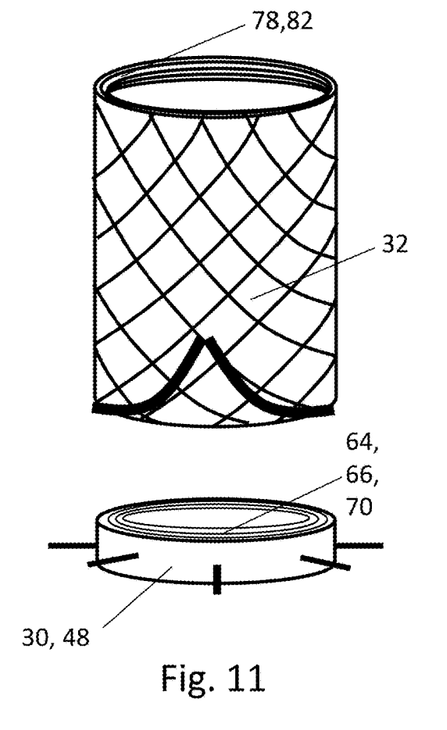
FIG. 11 is an illustration of another embodiment of a prosthetic valve implant and stent frame assembly with the docking station of FIG. 4.
Figure 12:
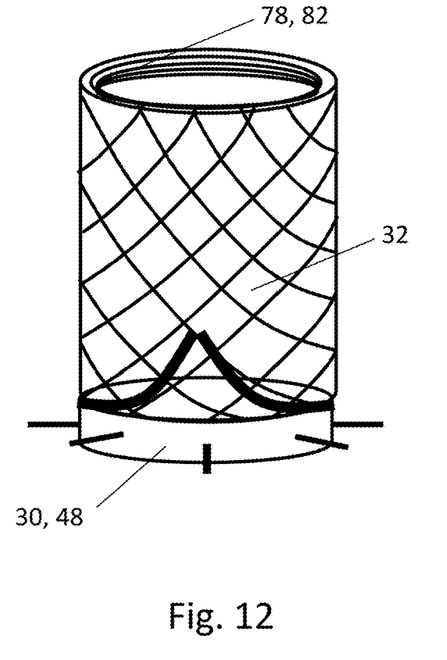
FIG. 12 is an illustration of the prosthetic valve implant and stent frame assembly of FIGS. 9-11 assembled with a respective the docking station.

The subannular ring (48) may also have a distal/downstream axial surface (64) with a mounting interlock or locator surface (66) adapted and configured to receive a cooperating mounting interlock or surface (68) of the stent frame structure (32) and/or the prosthetic valve (34). In one aspect, the distal/downstream axial surface (64) of the subannular ring (48) may include a groove (70) that is adapted and configured to be connected with cooperating tabs, a ridge or a rib structure(s) (72) projecting axially from the proximal end of the stent frame structure (32) and/or the prosthetic valve (34). In another aspect, the distal/downstream axial surface (64) of the subannular ring (48) may have a plurality of holes (74) that are adapted to receive pins (76) projecting axially from the proximal end of the stent frame structure (32) and/or the prosthetic valve (34). The holes (74) may be equiangularly spaced about the subannular ring (48). The structure used to connect the subannular ring (48) to the stent frame structure (32) and/or the prosthetic valve (34) is preferably adapted and configured to engage the existing valve structure (38, 44) and/or leaflets of the existing valve structure. For instance, the pins (76) projecting from the stent frame structure (32) and/or the prosthetic valve (34) may extend through the existing valve annular tissue and leaflets into the holes formed on the superior surface of the subannular ring (48). Thus, the existing valve (38, 44) and leaflets are captured and disposed between the subannular ring (48) and the stent frame structure (32) and/or the prosthetic valve (34). FIGS. 7-8 illustrate the existing valve (38, 44) and leaflets captured between the subannular ring (48) and the stent frame structure (32) and/or the prosthetic valve (34). The relative configuration of the pins, tabs and/or ridges (72) of the stent frame structure (32) and/or the prosthetic valve (34) and the groove and/or holes (70) of the subannular ring (48) may be reversed so that the stent frame structure and/or prosthetic valve is provided with a groove and/or holes and the distal/downstream axial face of the subannular ring is provided with a system of cooperating pins, tabs and/or ridges.

FIGS. 9-12 show embodiments of the stent frame structure (32) and the prosthetic valve (34). The stent frame structure (32) and prosthetic valve (34) are implanted in a position superior to the pulmonary valve (38) or the aortic valve (44), as desired. The stent frame structure (32) and prosthetic valve (34) may be deployed via an open surgical technique or endoventricularly via a catheter. In one aspect, the stent frame structure (32) and prosthetic valve (34) may be crimped to allow the assembly to be deployed, passed through the inner peripheral or diameter surface (54) of the subannular ring (48) and positioned superior to the respective valve. The stent frame structure (32) and/or the prosthetic valve (34) may have pins (76) that pierce the native valve leaflets so as to engage holes (74) formed on the superior axial surface of the subannular ring (48), as discussed above. Or the prosthetic valve (32) and/or stent frame structure (34) may have a ridge or a rib structure(s) (72) on its proximal end that engages the native leaflets of the existing valve and extend through the leaflets and valve tissue to the groove on the superior axial surface of the subannular ring (48).

Preferably, the existing heart tissue is disposed between the proximal end of the stent frame structure (32) and/or the prosthetic valve (34) and the subannular ring (48) with the radial prongs (50) of the subannular ring anchoring the assembly in the heart tissue, thereby reducing the likelihood of migration of the stent frame structure (32) and ventricular assist device (36).

The distal end of the stent frame structure (32) may include a mounting interlock or locator surface (78) that is adapted and configured to receive a cooperating mounting interlock or surface (80) of the ventricular assist device (36) in a manner to allow the ventricular assist device to be releasably connected to the distal end of the stent frame structure. For instance, the mounting interlock or locator surface (78) on inner peripheral or inner diameter surface at or adjacent to the distal end of the stent frame structure (32) may have a groove (82), which may be continuous, discontinuous, tapered and/or helical, that cooperates with a ridge or tabs (84), which may be continuous, discontinuous, tapered and/or helical, on the outer surface of the ventricular assist device (36), thereby allowing the ventricular assist device to be releasably connected the inner peripheral or diameter surface at or adjacent to the distal end of the stent frame structure. The ridge or tabs (84) on the distal end of the ventricular assist device (36) may have a complementary geometry with the groove(s) (82) on the inner diameter surface of the stent frame structure (32) to allow the ventricular assist device to be releasably connected to the stent frame structure. In the alternative, the distal end of the stent frame structure (32) may have pins extending radially inward from an inner peripheral or inner diameter surface at or adjacent to the distal end of the stent frame structure, and the inward extending radial pins may engage the outer diameter surface of the ventricular assist device (36) to support the distal end of the ventricular assist device in the respective artery.

Figure 13:
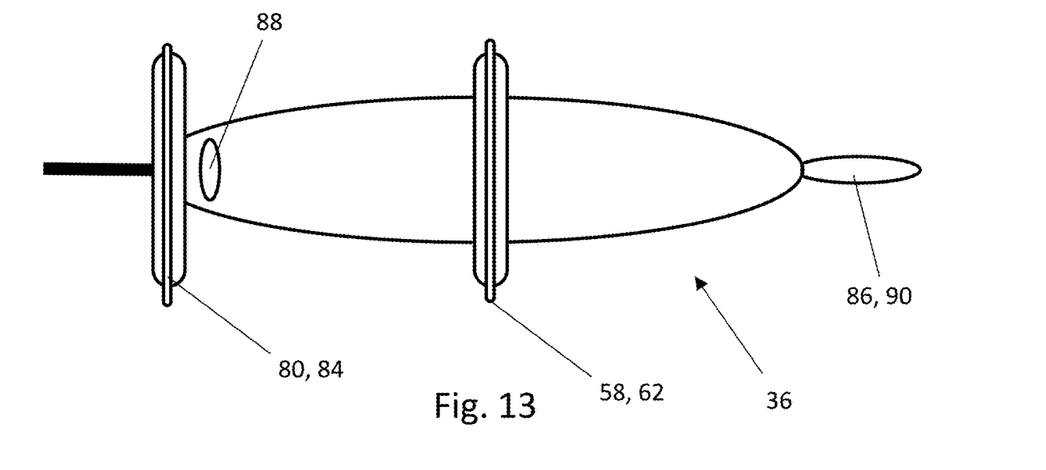
FIG. 13 is an illustration of an exemplary ventricular assist device.
Figure 14:
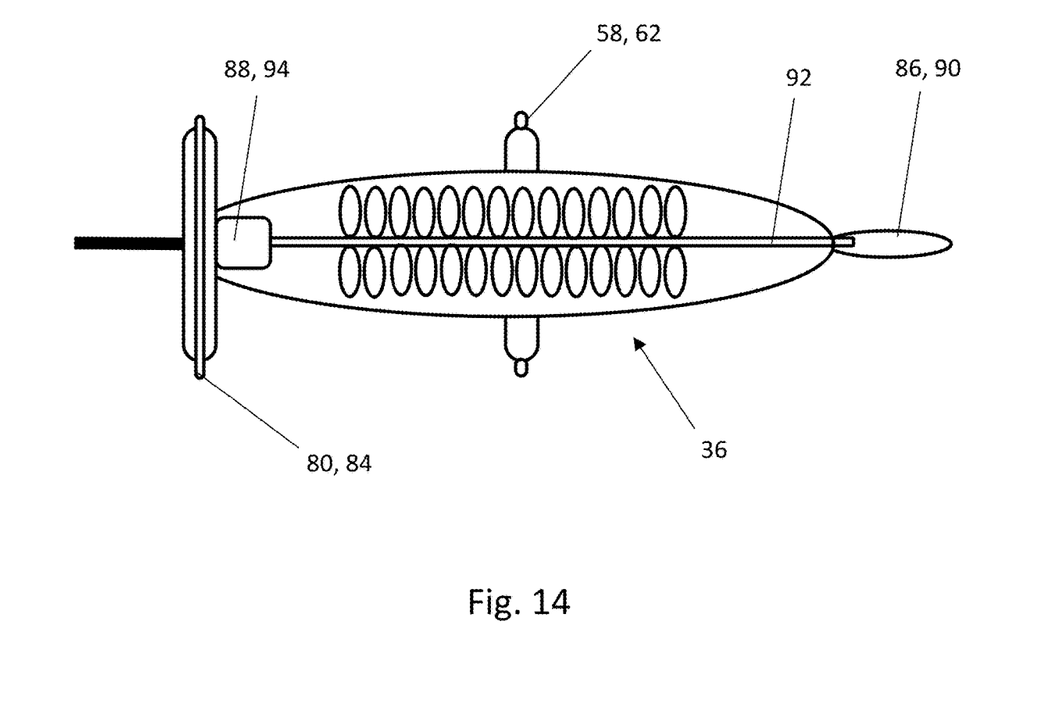
FIG. 14 is an cross-section view of the ventricular assist device of FIG. 13.
Figure 15:
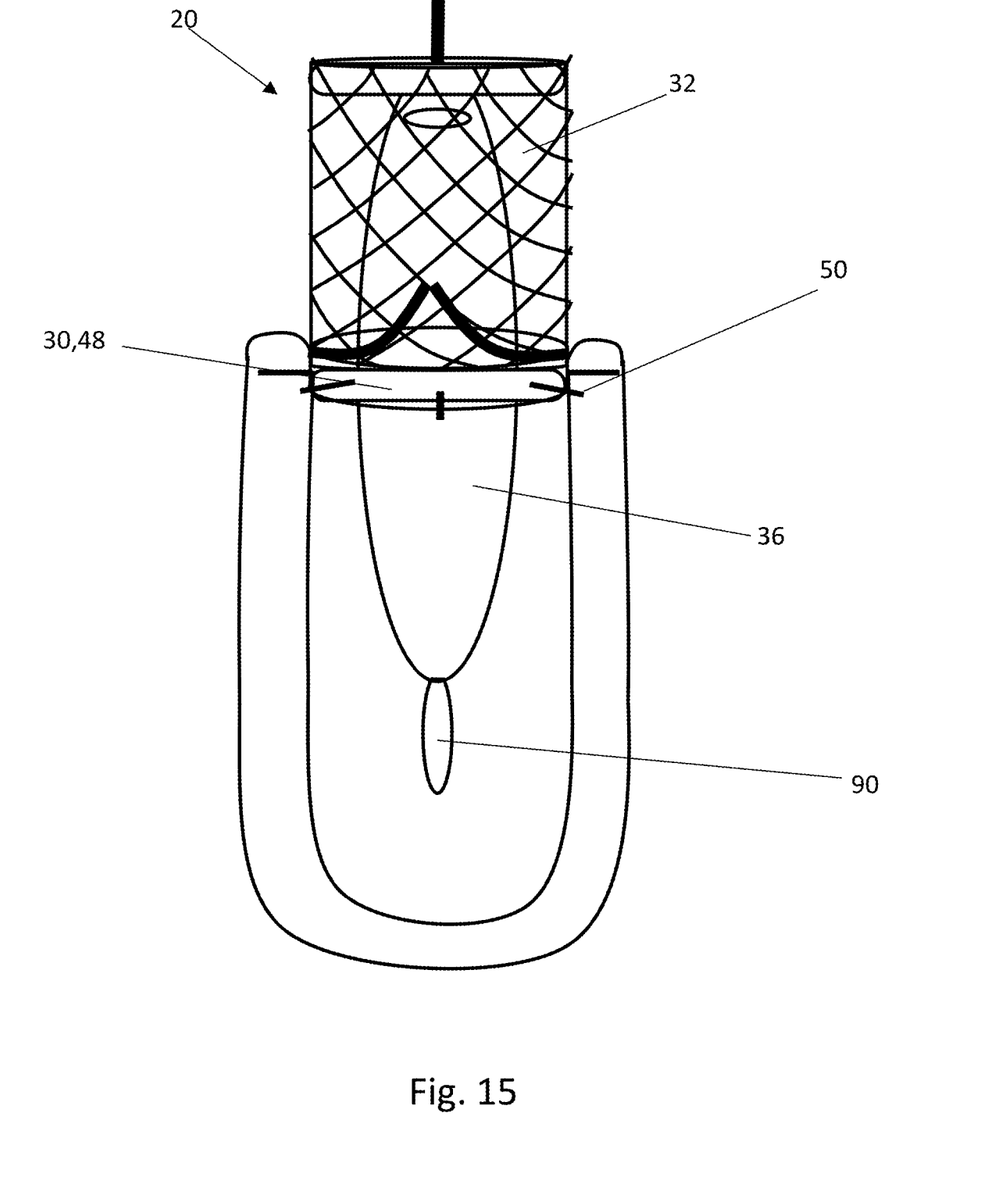
FIG. 15 is an illustration of the ventricular assist device assembled with the prosthetic valve and stent frame assembly and the docking station in the aortic/pulmonary valve.

FIGS. 13-14 show embodiments of the ventricular assist device (36). The ventricular assist device (36) is adapted and configured to be disposed within the stent frame structure (32) and extend through the prosthetic valve (34) and the existing valve, and into the respective ventricle with a releasable connection to the subannular ring (48), for instance, as shown in FIG. 15. The ventricular assist device (36) may have a proximal end with a suction inlet port (86) disposed in the respective ventricle, and a distal end with an outlet port (88) disposed in the respective pulmonary artery or aorta. The ventricular assist device (36) may have a mounting interlock or locator surface (58) on its outer diameter surface in a region intermediate of the proximal and distal ends that cooperates with the mounting interlock or locator surface on the inner diameter surface of the subannular ring (48) and positions the ventricular assist device so that the suction port (86) of the ventricular assist device is disposed within the respective ventricle. The locator surface (58) on the outer diameter surface in the intermediate region of the ventricular assist (36) device may be tabs, or ribs (62) that engage the groove (60) of the inner diameter surface of the sub annular ring (48). The tabs or ribs (62) on the outer diameter and intermediate surface of the ventricular assist device (36) and the groove (60) on the inner diameter surface of the subannular ring (48) may be shaped and sized (helically shaped or tapered) to allow the ventricular assist device to be rotated about its center axis in one direction through a particular angular rotation (e.g., a quarter turn or half-turn) to engage the tabs or ribs with the groove of the subannular ring, and rotated about its center axis in the opposite direction through a particular angular rotation (e.g., a quarter turn or half-turn) to disengage the tabs or ribs with the groove of the subannular ring.

The distal end of the ventricular assist device (36) may have a mounting interlock or locating surface (80) that engages the mounting interlock at the distal end (78) of the stent frame structure (32), thereby anchoring the ventricular assist device in position with the outflow of the ventricular assist device in the respective main artery, for instance, the aorta or the pulmonary artery. The mounting interlock or locator surface (80) on the distal end of the ventricular assist device (36) may be tabs, or ribs (84) that engage a groove (82) of the inner diameter surface at the distal end (78) of the stent frame structure (32). The tabs or ribs (84) on the distal end outer diameter surface of the ventricular assist device (36) and the groove (82) on the inner diameter surface of the stent frame structure (32) may be shaped and size (helically shaped or tapered) to allow the ventricular assist device to be rotated about its center axis in one direction through a particular angular rotation (e.g., a quarter turn or half-turn) to engage the tabs or ribs with the groove of the stent frame structure, and rotated about its center axis in the opposite direction through a particular angular rotation (e.g., a quarter turn or half-turn) to disengage the tabs or ribs with the groove of the stent frame structure. The distal end of the ventricular assist device (36) may also be provided with a groove or holes to engage pins extending radially inward from the inner diameter surface at or adjacent to the distal end of the stent frame structure.

The ventricular assist device may include helical style impeller (90) that is connected to a shaft (92) and a motor (94). The ventricular assist device (36) may be powered by an electrical system for instance a power cable (96) that is supplied via a subcutaneous implanted generator (98).

The ventricular assist device (36) may be adapted and configured to be deployed endovascularly with a catheter and unfurled or expanded once in place with a balloon catheter. Accordingly, the ventricular assist device (36) may be crimped for deployment until in position in the stent frame structure (32), and then expanded to engage the stent frame structure. In another aspect, the ventricular assist device (36) may be assembled in position in the stent frame structure (32) with one or pieces of the ventricular assist device crimped for deployment endovascularly and unfurled or expanded in the place, and then assembled within the stent frame structure to form the ventricular assist device. For instance, the casing and/or impeller and/or motor (90, 94) of the ventricular device (36) may be separately crimped for deployment endovascularly and sequentially assembled within the stent frame structure (32). In another aspect, the stent frame structure (32) may include portions of the ventricular assist device (36), and other portions of the ventricular assist device may be deployed and assembled with the stent frame structure as needed. In another aspect, the ventricular assist device (36) and/or portions of the ventricular assist device may be deployed through an open surgical technique with the power cable (96) deployed endovascularly through a peripheral artery or vein.

Figure 16:
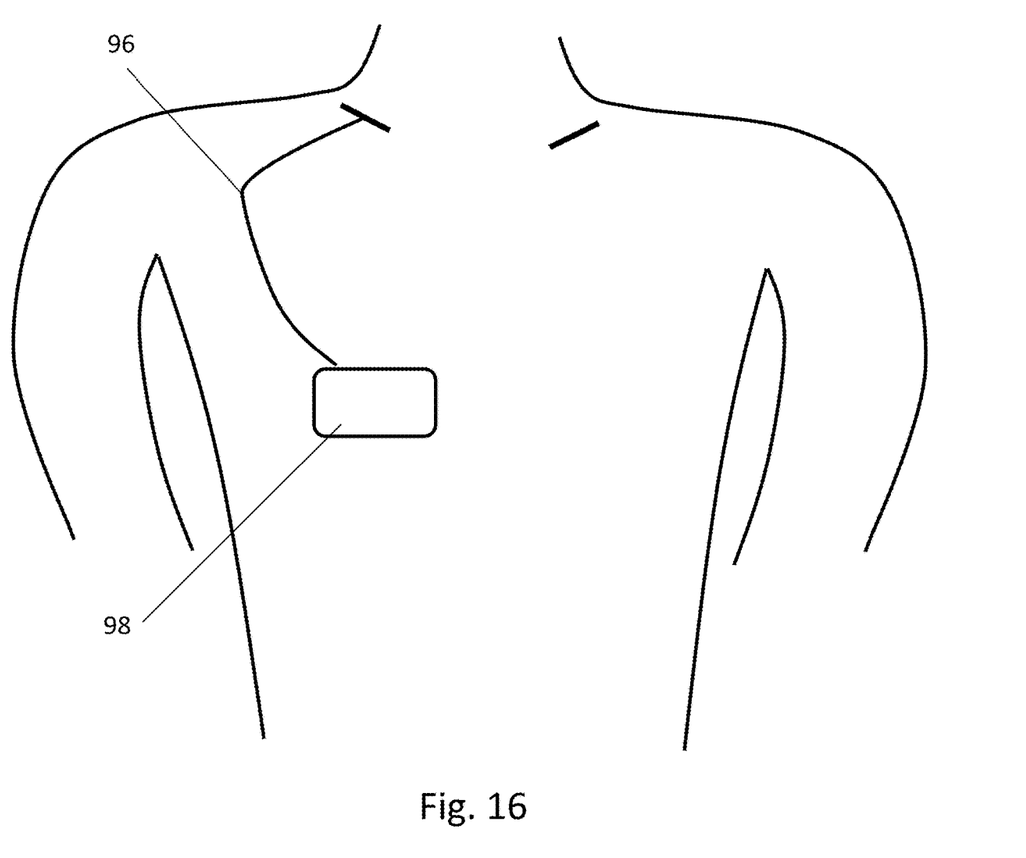
FIG. 16 is an illustration of a subcutaneously implanted power generator for the ventricular assist device.
Figure 17:
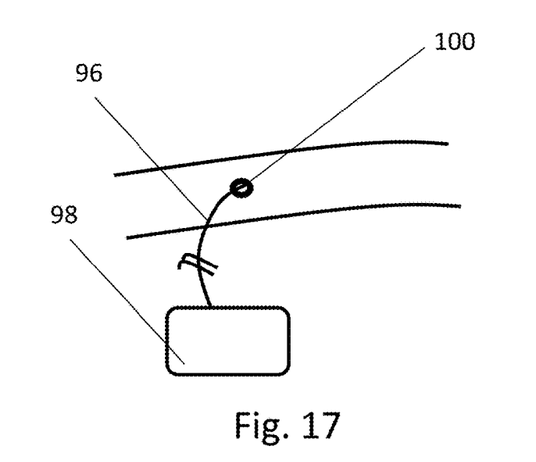
FIG. 17 is an illustration of the subcutaneous implanted power generator with power leads extending through an auxiliary vein to the ventricular assist device.

FIG. 15 shows the transcatheter valve implant assembly, generally indicated with the element (28), with ventricular assist device (36) releasably connectable to docking station (30). The ventricular assist device (36) is positioned within the stent frame structure (32) and extends through the existing valve and subannular ring (48) into the respective ventricle with the outlet (88) directed to a respective artery and the suction inlet (86) positioned in the respective ventricle. Depending upon the location of the ventricular assist device (36), the power cable (96) may be directed via a peripheral (e.g., auxiliary) artery or (e.g., auxiliary) vein, for instance, as illustrated in FIG. 16. To assist in anchoring the power cable (96), a ring (100) may be implanted in the wall of the artery or the vein to ensure that the power cable maintains position while maintaining the structural integrity of the respective vein or artery, for instance, as shown in FIG. 17.

Each of the devices may be deployed sequentially beginning with the subannular ring (48), next with prosthetic valve (34) and the stent frame structure (32) (either together as assembly or separately), and ending with the ventricular assist device (36).

By providing a ventricular assist device (36) that may be releasably connected with the subannular ring (48) and the stent frame structure (32), the ventricular assist device may be replaced as needed. For instance, the existing ventricular assist device (36) may be detachably connected to the distal end of the stent frame structure (32) and/or the subannular ring (48) and removed endoventricularly. A replacement ventricular assist device (36) may be inserted endoventricularly and releasably connected to the existing subannular ring (48) and the distal end of the stent frame structure (32).

In the description above, the principle and embodiments of the present application are illustrated herein by specific examples. The description of the above embodiments is only intended to facilitate the understanding of the method and the concept of the present application. For those skilled in the art, changes can be made to specific embodiments and an application scope of the present application, according to the concepts of the application. In conclusion, contents of the specification should not be construed as limitation to the present application.

What is claimed is:

1. A transcatheter valve implant assembly comprising a ventricular assist device, a prosthetic valve, a stent frame structure, and a docking station, the transcatheter valve implant assembly being adapted and configured to be implanted in a patient at an implantation site, the implantation site comprising at least one of an aortic valve and pulmonary valve of a patient, the ventricular assist device having a proximal end with an inlet and a distal end with an outlet, the ventricular assist device being adapted and configured to draw blood at the inlet and discharge blood from the outlet, the ventricular assist device having a first mounting interlock on its distal end and a second mounting interlock arranged intermediate of the proximal and distal ends;

the docking station having a outer peripheral surface adapted and configured to engage tissue of the patient at the implantation site, the docking station having an inner peripheral surface with an inner surface mounting interlock, the docking station having a distal axial face with a mounting interlock; and the stent frame structure having a proximal end and a distal end, the proximal end of the stent frame structure having a mounting interlock, the distal end of the stent frame structure having a mounting interlock;

wherein when the transcatheter valve implant assembly is implanted in a patient at the implantation site: (i) the stent frame structure defines a tubular member with the ventricular assist device positioned within the stent frame structure, (ii) the docking station defines a subannular ring with the outer peripheral surface of the docking station engaged with tissue of the patient at the implantation site, (iii) the inlet of ventricular assist device is positioned in the respective ventricle associated with the implantation site and the outlet of the ventricular assist device is positioned to discharge into a respective blood vessel associated with the implantation site, (iv) the first mounting interlock of the ventricular assist device is releasably connected to the distal end mounting interlock of the stent frame structure; (v) the second mounting interlock of the ventricular assist device is releasably connected to the inner peripheral surface mounting interlock of the docking station, (vi) the mounting interlock of the proximal end of the stent frame structure is interlocked with the mounting interlock of the distal axial face of the docking station, (vii) the prosthetic valve is disposed adjacent the proximal end of the stent frame structure; and (viii) the prosthetic valve is disposed at least one of adjacent to and against the distal axial face of the docking station.

2. The transcatheter valve implant assembly of claim 1 wherein the docking station is adapted and configured to be folded or crimped to facilitate endoventricular delivery and deployment of the docking station at the implantation site.

3. The transcatheter valve implant assembly of claim 1 wherein the docking station is adapted and configured to be unfurled with a balloon catheter to enable the outer peripheral surface of the docking station to engage the patient's tissue at the implantation site.

4. The transcatheter valve implant assembly of claim 3 wherein the outer peripheral surface of the docking station comprises a plurality of prongs projecting outward from the outer peripheral surface to engage the patient's tissue at the implantation site when the docking station is unfurled at the implantation site.

5. The transcatheter valve implant assembly of claim 1 wherein the inner surface mounting interlock of the inner peripheral surface of the docking station and the second mounting interlock of ventricular assist device comprise a cooperating groove and tab adapted and configured to releasably connect the second mounting interlock of the ventricular assist device to the mounting interlock of the inner peripheral surface of the docking station when the transcatheter valve implant assembly is implanted in a patient at the implantation site.

6. The transcatheter valve implant assembly of claim 1 wherein the first mounting interlock of the ventricular assist device and the mounting interlock of the distal end of the stent frame structure comprise a cooperating groove and tab adapted and configured to connect the first mounting interlock of the ventricular assist device with the mounting interlock of the distal end of the stent frame structure when the transcatheter valve implant assembly is implanted in a patient at the implantation site.

7. The transcatheter valve implant assembly of claim 1 wherein the mounting interlock of the distal axial face of the docking station and the mounting interlock of the proximal end of the stent frame structure comprise a cooperating groove and tab adapted and configured to connect the mounting interlock of the distal axial face of the docking station with the mounting interlock of the proximal end of the stent frame structure when the transcatheter valve implant assembly is implanted in a patient at the implantation site.

8. The transcatheter valve implant assembly of claim 1 wherein the mounting interlock of the distal axial face of the docking station engages the prosthetic valve when the transcatheter valve implant assembly is implanted in a patient at the implantation site.

9. The transcatheter valve implant assembly of claim 1 wherein the prosthetic valve is formed with the stent frame structure adjacent to the proximal end of the stent frame structure.

10. The transcatheter valve implant assembly of claim 1 wherein the mounting interlock of the distal axial face of the docking station and the mounting interlock of the proximal end of the stent frame structure comprise cooperating pins and holes adapted and configured to connect the mounting interlock of the distal axial face of the docking station with the mounting interlock of the proximal end of the stent frame structure when the transcatheter valve implant assembly is implanted in a patient at the implantation site.

11. The transcatheter aortic valve implant assembly of claim 10 wherein the ventricular assist device is powered by a power cable that is supplied via a subcutaneous implanted generator.

12. The transcatheter valve implant assembly of claim 1 wherein the ventricular assist device further comprises a helical style impeller connected to a shaft and a motor.

13. A method of implanting a transcatheter valve implant assembly in a patient at an implantation site, wherein the implantation site comprises at least one of an aortic valve and pulmonary valve of a patient, the method comprising:
  implanting a docking station at the implantation site;
  introducing a stent frame structure and a prosthetic valve to the implantation site;
  engaging native valve leaflets at the implantation site with at least one of the prosthetic valve and the stent frame structure while connecting a proximal end of a stent frame structure to a distal axial face of the docking station in a manner such that the prosthetic valve is adjacent to the proximal end of the stent frame structure;
  inserting a ventricular assist device in a hollow interior of a tubular form defined by the stent frame structure such that an inlet of ventricular assist device is positioned in the respective ventricle associated with the implantation site and the outlet of the ventricular assist device is positioned to discharge into the respective blood vessel associated with the implantation site; and
  releasably connecting the ventricular assist device with the stent frame structure and the docking station.

14. The method of claim 13 wherein the step of introducing the stent frame structure and the prosthetic valve to the implantation site includes folding or crimping at least one of the stent frame structure and the prosthetic valve and delivering the at least one of the stent frame structure and the prosthetic valve via a catheter to the implantation site.

15. The method of claim 13 further comprising the step of folding or crimping at least one of the docking station and the ventricular assist device and delivering the at least one of the docking station and the ventricular assist device via a catheter to the implantation site.

16. The method of claim 13 wherein the step of engaging native valve leaflets at the implantation site with at least one of the prosthetic valve and the stent frame structure includes arranging a cooperating groove and tab of a mounting interlock of the distal axial face of the docking station and a mounting interlock of the proximal end of the stent frame structure to engage the native leaflets while connecting the proximal end of the stent frame structure to the distal axial face of the docking station.

17. The method of claim 13 wherein the step of engaging native valve leaflets at the implantation site with at least one of the prosthetic valve and the stent frame structure includes arranging cooperating pins and holes of a mounting interlock of the distal axial face of the docking station and a mounting interlock of the proximal end of the stent frame structure to engage the native leaflets while connecting the proximal end of the stent frame structure to the distal axial face of the docking station.

18. The method of claim 13 wherein the step of engaging native valve leaflets at the implantation site with at least one of the prosthetic valve and the stent frame structure includes connecting a cooperating groove and ridge of the distal axial face of the docking station and the prosthetic valve together such that the prosthetic valve is adjacent to the proximal end of the stent frame structure and the distal axial face of the docking station with the native leaflets between the prosthetic valve and the distal axial face of the docking station.

19. The method of claim 13 further comprising aligning the ventricular assist device to receive power via a subcutaneous implanted generator.

20. The method of claim 19 further comprising inserting a power cable for the ventricular assist device through at least one of an auxiliary vein and artery.

21. The method of claim 13, wherein the step of implanting the docking station at the implantation site includes unfurling the docking station with a balloon catheter and urging an outer peripheral surface of the docking station to engage the patient's tissue at the implantation site.

22. The method of claim 21 wherein when the implantation site comprises the aortic valve, the step of implanting the docking station at the implantation site includes engaging the patient's tissue at the aortomitral continuity and the septum at the left ventricular outflow tract tissue, and when the implantation site comprises the pulmonary valve, the step of implanting the docking station at the implantation site includes engaging the patient's tissue right ventricular outflow tract tissue and the septum.

23. The method of claim 13, wherein the step of releasably connecting the ventricular assist device with the stent frame structure and the docking station includes:
　　releasably connecting a mounting interlock at a distal end of the ventricular assist device with a mounting interlock at a distal end of the stent frame structure; and
　　releasably connecting a mounting interlock intermediate of a proximal end and the distal end of the ventricular assist device with a mounting interlock on an peripheral inner surface of the docking station.

24. A transcatheter valve implant assembly comprising a ventricular assist device, a prosthetic valve having a stent frame structure, and a docking station for the stent frame structure and the ventricular assist device;
　　wherein when the transcatheter valve implant assembly is implanted in a patient at one of an aortic valve and pulmonary valve of the patient, the docking station comprises a subannular ring, the subannular ring has an inner diameter surface with a locator surface adapted and configured to receive a cooperating surface of the ventricular assist device such that the ventricular assist device is releasably connected to the subannular ring, the subannular ring has a distal axial surface having a locator surface adapted and configured to receive a cooperating surface of one of the stent frame structure and the prosthetic valve such that the one of the stent frame structure and the prosthetic valve is connected to the subannular ring, and the ventricular assist device is positionable within the stent frame structure and releasably connectable with the stent frame structure and the docking station.

25. The transcatheter valve implant assembly of claim 24 wherein the docking station is adapted and configured to be folded or crimped to facilitate deployment of the docking station prior to implantation.

26. The transcatheter valve implant assembly of claim 24 wherein the docking station is adapted and configured to be unfurled with a balloon catheter to secure the docking station in a desired position within the respective left or right ventricle when the transcatheter valve implant assembly is implanted in a patient.

27. The transcatheter valve implant assembly of claim 26 wherein the docking station has an outer diameter surface comprising prongs adapted and configured to anchor the docking station into heart tissue when the transcatheter valve implant assembly is implanted in a patient.

28. The transcatheter valve implant assembly of claim 24 wherein the locator surface of the inner diameter surface of the docking station comprises a groove, and wherein the cooperating surface of the ventricular assist device comprises a ridge, the groove and the ridge are adapted and configured to cooperate such that the ventricular assist device is releasably anchored to the inner diameter surface of the docking station when the transcatheter valve implant assembly is implanted in a patient.

29. The transcatheter valve implant assembly of claim 24 wherein the locator surface of the distal axial surface of the docking station comprises a grooves, and wherein the cooperating surface of one of the stent frame structure and the prosthetic valve comprises a ridge, the groove and the ridge are adapted and configured to cooperate such that the one of the stent frame structure and the prosthetic valve is releasably anchored to the inner diameter surface of the docking station when the transcatheter valve implant assembly is implanted in a patient.

30. The transcatheter valve implant assembly of claim 24 wherein the distal axial surface of the docking station comprises a plurality of holes being adapted to receive pins projecting axially from the proximal end of one of the stent frame structure and the prosthetic valve to facilitate the connection of the docking station to the one of the stent frame structure and prosthetic valve when the transcatheter valve implant assembly is implanted in a patient.

31. The transcatheter valve implant assembly of claim 30 wherein the plurality of holes are equiangularly spaced about the docking station.

32. The transcatheter valve implant assembly of claim 24 wherein the ventricular assist device further comprises a helical style impeller connected to a shaft and a motor.

33. The transcatheter valve implant assembly of claim 32 wherein the ventricular assist device is powered by a power cable that is supplied via a subcutaneous implanted generator.

\* \* \* \* \*